March 26, 1968
L. E. REDMAN
3,374,849
ELECTRIC VEHICLE
Filed Sept. 28, 1966
2 Sheets-Sheet 1
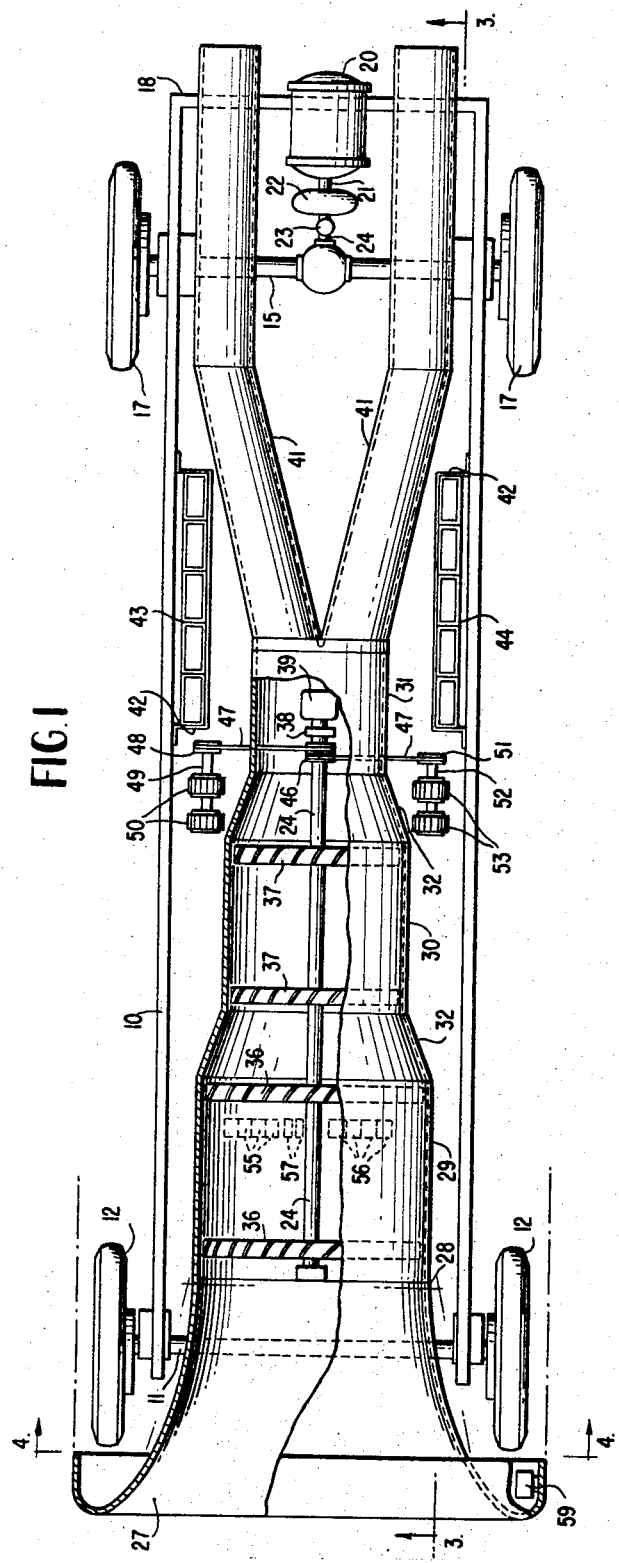
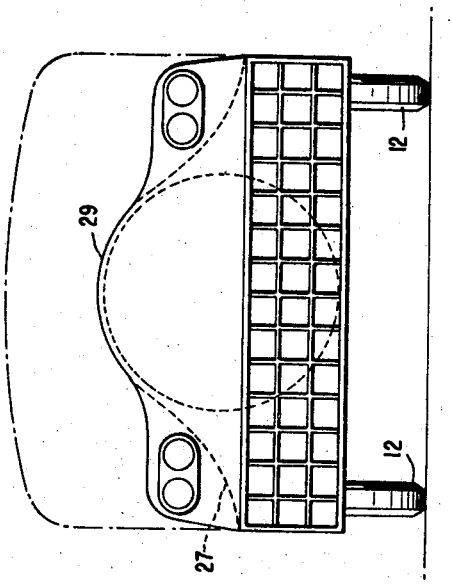
INVENTOR
LAWRENCE E. REDMAN
BY *Kenon, Palmer, Stewart & Estabrook*
ATTORNEYS March 26, 1968
L. E. REDMAN
3,374,849
ELECTRIC VEHICLE
Filed Sept. 28, 1966
2 Sheets-Sheet 2
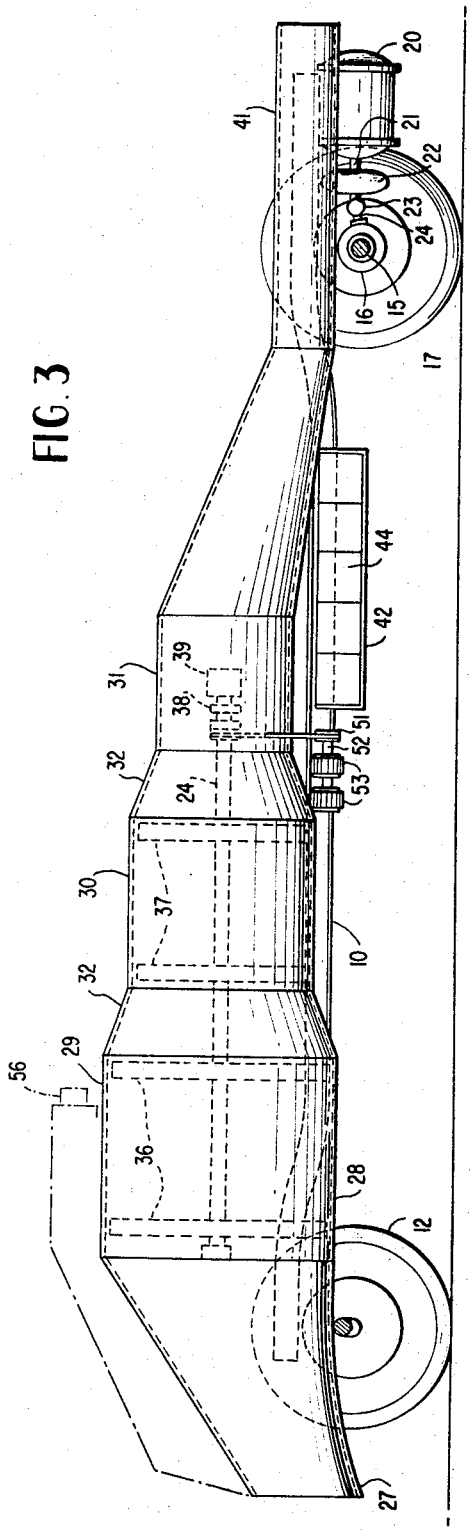
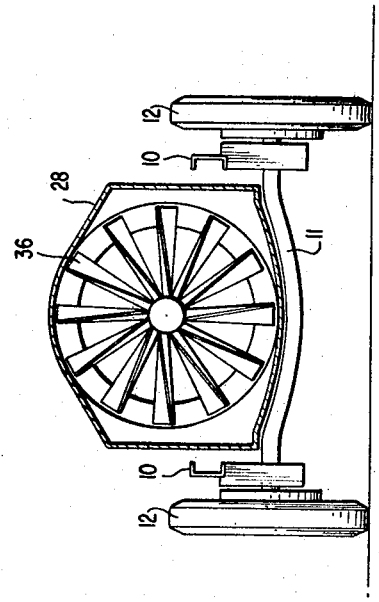
INVENTOR
LAWRENCE E. REDMAN
BY Kemon, Palmer, Stewart & Estabrook
ATTORNEYS

3,374,849
ELECTRIC VEHICLE
Lawrence E. Redman, 2005 E. Adams St.,
Phoenix, Ariz. 85034
Filed Sept. 28, 1966, Ser. No. 582,647
7 Claims. (Cl. 180—65)

This invention relates broadly to motor vehicles and more specifically to improvements in the propulsion system therefor.

One of the objects of the present invention is to provide an electric motor propelled vehicle having two banks of batteries with means for driving said motor by one bank of bateries while charging the other bank of batteries.

Another object is to provide an electric motor propelled vehicle having an air driven turbine mounted thereon which is connected to two banks of batteries for charging one bank of batteries while the other bank of batteries provides the motive power for propelling the vehicle.

Still another object is to provide an electric motor propelled vehicle having an air driven turbine mounted thereon and operatively connected to a plurality of alternators for charging a plurality of batteries with which to drive the electric motor.

Other objects and advantages more or less ancillary to the foregoing in the manner in which all of the various objects are realized will appear in the following description, which, when considered in connection with the accompanying drawings, sets forth the preferred embodiment of the invention.

Referring to the drawings wherein the preferred embodiment of the invention is illustrated:

FIGURE 1 is a plan view of a vehicle embodying the present invention with the body thereof having been removed in the interest of clarity;

FIGURE 2 is a front elevational view of the vehicle of the present invention with the forward portion of the body being illustrated in broken lines;

FIGURE 3 is a vertical sectional view of the vehicle embodying the present invention, the view being taken on the line 3—3 of FIGURE 1; and FIGURE 4 is a vertical sectional view of the front end portion of the vehicle of the present invention, the view being taken on the plane 4—4 of FIGURE 1.

Referring to FIGURE 1, there is shown a vehicle frame 10 with an axle 11 mounted on the forward end thereof for rotatably supporting a pair of front wheels 12. The front wheels are provided with conventional steering arms and linkage, not shown, to facilitate the turning and guiding of said motor vehicle.

The rear end portion of the frame 10 has mounted thereon an axle housing 15 which is provided with a conventional differential unit 16 with the rear driving wheels 17 being connected to the axle housing 15. The rear end of the vehicle frame 10 is provided with a transverse member 18 which constitutes a support for an electric motor 20. The motor may be a DC motor of 15 HP and operating on 110 volts and said motor is provided with an output shaft 21 that is connected to an electrically actuated clutch member 22. The drive shaft of the clutch 22 is connected to a universal joint 23 that in turn is drivingly connected by a shaft 24 to the differential unit 16. Thus, upon energization of the motor 20 and actuation of the clutch 22, the rear wheels 17 of the vehicle will be rotatably driven through the differential unit 16 and axle housing 15 to propel the vehicle.

The forward end of the vehicle frame 10 has mounted thereon an enlarged air scoop 27 which has the configuration of a funnel and is of such a size as to extend across the forward end of the vehicle so as to substantially enclose or overlie the front wheels 12. The air scoop 27 merger into an elongated housing 28 that is formed with a plurality of communicating sections or areas 29, 30 and 31. The sections 30 and 31 are each of progressively smaller diameter than the preceding section or area and a tapered collar or portion 32 is employed to connect the several sections to one another. The sections 29, 30 and 31 have positioned therein a shaft 35 which is mounted upon suitable supports, not shown, for rotative movement within said housing. The forward end portion of the shaft 24 within the section 29 of the housing 28 has mounted thereon turbine elements or fan members 36 that are arranged in spaced relation to one another and which are of a diameter slightly less than the internal of said section. The section 30 of the housing 28 is also provided with a pair of spaced turbine elements or fan members 37 mounted on the shaft 21 which are of a diameter slightly less than the internal diameter of the section. The shaft 24 terminates within the section 31 of the housing 28 and an electrically actuated clutch member 38 is connected to the end thereof. The clutch member 38 is in turn connected to an electric motor 39 for imparting initial rotation to the shaft 24 and the turbine elements mounted thereon.

The section 31 of the housing 28 has connected thereto a bifurcated exhaust or passageway system consisting of a pair of tubular conduits 41 which project outwardly beyond the rear end of the vehicle and are supported upon the transverse member 18. These conduits permit the air which has entered the housing 28 and moved through the various sections thereof, for rotating the turbine elements, to be discharged at the rear of the vehicle. The vehicle frame 10 has mounted on each side thereof a suitable bracket or support 42 for the reception of five storage batteries of 24 volts each. This arrangement constitutes a right bank of batteries 43 and a left bank of batteries 44 which are connected by suitable cables, not shown, to the electric motor 20. The two banks of batteries are provided with suitable controls, not shown, to facilitate the connection of one bank of batteries to the motor 20 while disconnecting the other bank of batteries from the motor 20 so that through said controls both banks of batteries may be disconnected from the motor 20 when the vehicle is not in operation, while first one and then the other bank of batteries may be connected to the motor 20 while the vehicle is being operated.

The shaft 24 adjacent the clutch member 38 in the housing section 31 has a pair of pulleys 46 mounted thereon for rotation therewith. Each of the pulleys 46 has a belt 47 entrained thereabout with one of the belts engaging a pulley 48 that is secured to a shaft 49 which is supported on the right side of the vehicle frame 10. The shaft 49 also has a pair of alternators 50 affixed thereon in spaced relation to one another for rotation with said shaft and pulley. The other belt 47 is likewise connected to a pulley 51 that is secured to a shaft 52 which has a pair of alternators 53 mounted thereon in spaced relation to one another. The alternators 50 are connected to the right bank of batteries 43 while the alternators 53 are connected to the left bank of batteries 44. The top of the housing 28 above the section 29 has mounted thereon, by any suitable means, a bank of four switches 55 for controlling the four alternators 50 and 53 while four voltage regulators 56 are provided for the four alternators. There is also provided on top of the housing 28 a pair of rheostats 57 which are connected to the right and left bank of batteries. The forward inturned end portion of the air scoop 27 has mounted thereon, by suitable brackets, not shown, a conventional battery charger 59 that is connected to the two banks of batteries to facilitate the charging of said batteries when the vehicle is not operating by connecting the battery charge 59 to a suitable source of electric current.

In the use of the vehicle of the present invention, the motor 39 is energized and the clutch 38 is actuated so as to initiate rotation of the shaft 24 and the turbine elements 36 and 37. This rotation of the shaft 24 will also drive the alternators 50 and 53. The motor 20 is then energized by connecting it to one of the banks of batteries after which the clutch 22 may then be actuated for driving through the differential unit 16 the vehicle wheels 17 and moving the vehicle forwardly. As the vehicle is moved forwardly by means of the motor 20, air will be directed into the housing 28 by means of the scoop 27 and the air in moving through the housing 28 will rotate the turbine elements 36 and 37 in the compartments or sections 29 and 30 and the air will then flow through the compartment 30 and into the conduits 41 from whence it will be exhausted at the rear of the vehicle. As the air moves through the housing 28, it will continue to rotate the turbine elements 36 and 37, thus permitting the clutch 38 to be disengaged and the motor 39 turned off as the rotation of the turbine elements 36 and 37 will drive the alternators 50 and 53. Assuming that the motor 20 is being run by the right bank of batteries 43 so that through the switches 55 the left bank of batteries may be charged and when the right bank of batteries 43 become weak and incapable of driving the motor 20, the left bank of batteries 44 may then be cut into operation for driving the motor 20 while the right bank of batteries 43 may then be charged by the alternators 50 and 53. In this manner, one bank of batteries will be charged by the alternators while the other bank of batteries is used for driving the motor 20 and the charging of the bank of batteries by the alternators will be accomplished by the rotative movement of the turbine elements 36 and 37 within the housing 28. The rotation of the turbine elements, of course, is accomplished by means of the air moving through the housing from the scoop 27 and into the conduits 41 from whence it will be exhausted at the rear of the vehicle.

In the foregoing manner the vehicle can be operated by means of the electric motor 20 wherein one bank of batteries is used to supply power to the motor while the other bank of batteries is being charged by the alternators. The banks of batteries may be reversed when one bank becomes incapable of driving the motor 20, so that by alternately charging the banks of batteries and driving the electric motor off of the bank of batteries that is not being charged, the vehicle may be propelled over a roadway to insure that the air stream moving through the scoop 27 and housing 28 will drive the turbine elements. The continued rotation of the turbine elements by means of the air flowing through the housing permits the alternators to charge one bank of batteries while allowing the vehicle to move forward by means of the motor 20 being operated from the other bank of batteries.

Although the foregoing description is necessarily of a detailed character, in order that the invention may be completely set forth, it is to be understood that the specific terminology is not intended to be restrictive or confining and that various rearrangements of parts and modifications of detail may be resorted to without departing from the scope and spirit of the invention as herein claimed.

What is claimed is:

1. In a vehicle having a frame and a pair of driving wheels, an electric motor mounted on said frame and connected to said wheels for rotatably driving same, a support mounted on each side of said vehicle frame, a bank of batteries in each support, an air scoop at the forward end of said frame, an elongated housing communicating with said scoop, a plurality of turbine elements positioned in said housing for rotation therein, a plurality of alternators driven by said turbine elements and control means for connecting said electric motor to one of said bank of batteries for driving said vehicle while connecting the other bank of batteries to said alternators for replenishing the charge in said other bank of batteries upon the rotation of said turbine elements.

2. In a vehicle of the type as defined in claim 1 wherein said frame has mounted thereon a battery charging unit connected to said banks of batteries; said unit having means for connecting same to a source of power for charging the banks of batteries when said vehicle is not in use.

3. In a vehicle of the type as defined in claim 1 wherein said elongated housing is formed with a plurality of sections progressively smaller in diameter with the last section connected to a bifurcated exhaust conduit system, and at least two sections of said housing having turbine elements positioned therein.

4. In a vehicle of the type as defined in claim 3 wherein said turbine elements are mounted on a shaft in said housing with an electric motor connected to said shaft by a clutch element for rotating said shaft and alternators prior to and during the initial movement of said vehicle by said electric motor mounted on said frame.

5. In a vehicle of the type as defined in claim 4 wherein said shaft is provided with a pair of pulleys for driving said alternators by means of a pair of belts.

6. In a vehicle of the type as defined in claim 5 wherein said housing has a plurality of switches mounted thereon for controlling said alternators whereby said alternators upon the rotation of said turbine elements will charge one bank of batteries while the other bank of batteries will be rotating said electric motor for driving said vehicle.

7. In a vehicle of the type as defined in claim 1 wherein said air scoop is formed with an enlarged portion substantially encompassing the forward end of the vehicle frame and a grill element positioned across said enlarged portion.

References Cited

UNITED STATES PATENTS

| | | | |
|---|---|---|---|
| 680,535 | 8/1901 | Meriam | 180—65 XR |
| 1,551,594 | 9/1925 | Walter | 180—65 |
| 2,581,596 | 1/1952 | Nims | 180—65 |
| 2,941,613 | 6/1960 | Di Perna | 180—65 |
| 3,348,623 | 10/1967 | Potter | 180—65 |

RICHARD J. JOHNSON, *Primary Examiner.*

M. L. SMITH, *Assistant Examiner.*